(12) United States Patent
Koniaris et al.

(10) Patent No.: US 9,317,952 B2
(45) Date of Patent: Apr. 19, 2016

(54) CONTENT AWARE TEXTURE MAPPING ON DEFORMABLE SURFACES

(71) Applicant: DISNEY ENTERPRISES, INC., Burbank, CA (US)

(72) Inventors: Charalampos Koniaris, Edinburgh (GB); Darren Cosker, Bath (GB); Xiasong Yang, Poole (GB); Kenneth John Mitchell, Earlston (GB); Iain Matthews, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 252 days.

(21) Appl. No.: 13/838,840

(22) Filed: Mar. 15, 2013

(65) Prior Publication Data

US 2014/0267306 A1  Sep. 18, 2014

(51) Int. Cl.
*G06T 13/20* (2011.01)
*G06T 15/04* (2011.01)

(52) U.S. Cl.
CPC ............... *G06T 13/20* (2013.01); *G06T 15/04* (2013.01)

(58) Field of Classification Search
CPC .............................. G06T 15/04; G06T 13/20
USPC ................................................. 345/473, 582
See application file for complete search history.

(56) References Cited

U.S. PATENT DOCUMENTS

| | | | |
|---|---|---|---|
| 2003/0086603 A1* | 5/2003 | Davidson et al. | 382/154 |
| 2009/0128556 A1* | 5/2009 | Fischer et al. | 345/420 |
| 2009/0310828 A1* | 12/2009 | Kakadiaris et al. | 382/118 |

OTHER PUBLICATIONS

Sorkine et al. Bounded-distortion Piecewise mesh Parameterization. Oct. 27, 2002, VIS '02 Proceedings of the conference on Visualization '02. pp. 355-362.*
Navazo I., Poulin P.: Content-Aware Texture Mapping on Deformable Surfaces. Eurographics 2013, pp. 1-10, vol. 32 (2013), No. 2.
Ben-Chen M., Weber O., Gotsman C.: Variational harmonic maps for space deformation. In ACM Transactions on Graphics (TOG) (2009), vol. 28, ACM, p. 34.
Burley B., Lacewell D.: Ptex: Per-face texture mapping for production rendering. In Computer Graphics Forum (2008), vol. 27, Wiley Online Library, pp. 1155-1164.
Botsch M., Sorkine O.: On linear variational surface deformation methods. Visualization and Computer Graphics, IEEE Transactions 14, 1 (2008), 213-230.

(Continued)

*Primary Examiner* — Kimbinh T Nguyen
(74) *Attorney, Agent, or Firm* — Sheppard Mullin Richter & Hampton LLP

(57) ABSTRACT

A method is disclosed for reducing distortions introduced by deformation of a surface with an existing parameterization. In one embodiment, the distortions are reduced over a user-specified convex region in texture space ensuring optimization is locally contained in areas of interest. A distortion minimization algorithm is presented that is guided by a user-supplied rigidity map of the specified region. In one embodiment, non-linear optimization is used to calculate the axis-aligned deformation of a non-uniform grid specified over the region's parameter space, so that when the space is remapped from the original to the deformed grid, the distortion of the rigid features is minimized. Since grids require minimal storage and the remapping from one grid to another entails minimal cost, grids can be precalculated for animation sequences and used for real-time texture space remapping that minimizes distortions on specified rigid features.

13 Claims, 8 Drawing Sheets

(56) References Cited

OTHER PUBLICATIONS

Floater M., Hormann K.: Surface parameterization: a tutorial and survey. Advances in multiresolution for geometricmodelling (2005), 157-186.

Heckbert P.: Survey of texture mapping. Computer Graphics and Applications, IEEE 6,11 (1986), 56-67.

Hormann K., Lévy B., Sheffer A., et al.: Mesh parameterization: Theory and practice. SIGGRAPH Course Notes (2007).

Jacobson A., Baran I., Popovic J., Sorkine O.: Bounded biharmonic weights for real-time deformation. SIGGRAPH' 11: ACM SIGGRAPH 2011 Papers (2011).

Joshi P., Meyer M., Derose T., Green B., Sanocki T.: Harmonic coordinates for character articulation. ACM Transactions on Graphics (TOG) 26,3 (2007), 71.

Ju T., Schaefer S., Warren J.: Mean value coordinates for closed triangular meshes. In ACM Transactions on Graphics (TOG) (2005), vol. 24, ACM, pp. 561-566.

Kraevoy V., Sheffer A., Shamir A., Cohenor D.: Non-homogeneous resizing of complex models. In ACM Transactions on Graphics (TOG) (2008), vol. 27, ACM, p. 111.

Lipman Y., Levin D., Cohen-Or D.: Green coordinates. In ACM Transactions on Graphics (TOG) (2008), vol. 27, ACM, p. 78.

Maillot J., Yahia H., Verroust A.: Interactive texture mapping. In Proceedings of the 20th annual conference on Computer graphics and interactive techniques (1993), ACM, pp. 27-34.

Popa T., Julius D., Sheffer A.: Material-aware mesh deformations. In Shape Modeling and Applications, 2006. SMI 2006. IEEE International Conference on (2006), IEEE, pp. 22-22.

Panozzo D., Weber O., Sorkine O.: Robust image retargeting via axis-aligned deformation. In Computer Graphics Forum (2012), vol. 31, Wiley Online Library, pp. 229-236.

Rubinstein M., Gutierrez D., Sorkine O., Shamir A.: A comparative study of image retargeting. In ACM Transactions on Graphics (TOG) (2010), vol. 29, ACM, p. 160.

Sorkine O.: Laplacian mesh processing. In Eurographics State-of-the-Art Report (2005), pp. 53-70.

Sheffer A., Praun E., Rose K.: Mesh parameterization methods and their applications. Foundations and Trends in Computer Graphics and Vision 2, 2 (2006), 105-171.

Vaquero D., Turk M., Pulli K., Tico M., Gelfand N.: A survey of image retargeting techniques. Proceedings of SPIE—The International Society for Optical Engineering, Applications of Digital Image Processign XXXIII 7798 (2010).

Xu W., Zhou K.: Gradient domain mesh deformation—a survey. Journal of computer science and technology 24, 1 (2009), 6-18.

Yang X., Southern R., Zhang J.: Fast simulation of skin sliding. Computer animation and Virtual Worlds 20, 2-3 (2009), 333-342.

Falco R., Driskill H.: Inverse Texture Warping. SIGGRAPH' 02: ACM SIGGRAPH 2002 Papers (2002).

* cited by examiner

CONTENT AWARE TEXTURE MAPPING ON DEFORMABLE SURFACES

TECHNICAL FIELD

The present disclosure relates generally to computer animation, and, more particularly, to a method for minimizing distortions introduced by deformation of a surface with an existing parameterization.

DESCRIPTION OF THE RELATED ART

Computer animation is a vital component of contemporary computer games and film productions. Texture mapping is the process of mapping detail to an animated surface using a parameterization of the surface, the most common case being a 2D parameterization of a 3D surface. A 2D parameterization of a 3D model is usually represented as a piecewise-linear mapping between a triangulated 3D mesh (x,y,z) and a corresponding triangulation on the 2D plane (u,v). Some surface representations have natural parameterizations (e.g., NURBS), while others, such as polygonal meshes, require non-trivial methods to obtain such parameterizations. In the latter group, parameterizations are represented in the same way vertices are: as piece-wise linear approximations to continuous functions. Naturally, dense discretizations of these functions result in higher-quality approximations.

A metric for the quality of a parameterization is the distortion introduced by the mapping. Another source of distortion is the error introduced by the piecewise-linear approximation, mentioned above. Both of these sources of distortion depend on the parameterization algorithm used, as well as the 3D surface discretization. Distortion can also be caused by a non-Euclidean transformation of an already parameterized surface: an optimal parameterization of the original surface can frequently be suboptimal for the deformed surface.

BRIEF SUMMARY OF THE DISCLOSURE

This disclosure introduces a method to reduce distortions introduced by deformation of a surface with an existing parameterization. In one embodiment, the distortions are reduced over a user-specified convex quadrilateral in texture space ensuring optimization is locally contained in areas of interest. The distortion minimization algorithm is guided by a user-supplied rigidity map of the specified quadrilateral. Non-linear optimization is used to calculate the warping of a texture-space mesh specified over the area of interest's parameter space, so that when the space is remapped from the original to the deformed texture-space mesh, the distortion of the rigid features are minimized. In one embodiment, the mesh is a non-uniform grid and the warping is axis-aligned deformation of the horizontal and vertical grid lines of such a grid. As such grids require minimal storage, and the remapping from a grid to another has minimal cost, grids for animation sequences can be precalculated and used for real-time texture space remapping that minimizes distortions on specified rigid features.

One embodiment of the disclosed method comprises selecting a region from a 2D parameterization domain; receiving rigidity data on the selected region; partitioning the selected region into a non-uniform grid comprising a plurality of cells, thereby defining a resting state grid; calculating a weight value for each of the plurality of cells using the rigidity data, thereby defining a weight matrix; and determining a deformed state grid by using data from the weight matrix to adjust the resting state grid. The step of defining a resting state grid may be substantially automated. In a more particular embodiment, the selected region from the 2D parameterization domain is a convex quadrilateral region. The selected region may be partitioned such that similar rigidity values are clustered together to form a plurality of cells. More particularly, each of the plurality of cells may be separated by a plurality of boundary lines, and for each boundary line separating a lower rigidity cell from a higher rigidity cell, the boundary line separating the lower rigidity and higher rigidity cells is moved slightly towards the lower rigidity cell. In one embodiment, the weight value for a particular cell is equal to the maximum rigidity value of that cell.

The disclosure is also embodied in a non-transitory computer readable medium comprising an instruction set configured to cause a computing device to perform the disclosed method.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

DETAILED DESCRIPTION

A 2D parameterization of a 3D model is usually represented as a piecewise-linear mapping between a triangulated 3D mesh (x,y,z) and a corresponding triangulation on the 2D plane (u, v). One of the desired qualities of such a mapping is the minimization of distortions. When animated models are considered, such a mapping is harder to achieve, especially if the animation is not known in advance. When texture or displacement maps are applied on animated parameterized surfaces, such distortions result in an "elastic" look of the mapped detail. This disclosure introduces a technique that dynamically updates the 2D parameterization of a region of a 3D model based on the original parameterization, the 3D model in its undeformed and deformed states, and a rigidity map of the region. The parameter space of the region is warped so that the resulting region, when remapped, exhibits minimal distortions. The result is a dynamic content-aware texturing, focused on minimizing distortions in regions of interest. The technique has a variety of applications, such as animation previews with mapped detail and precalculated texture distortion correction for animated characters.

Introduction

Texture mapping is the process of mapping detail to a surface using a parameterization of the surface, the most common case being a 2D parameterization of a 3D surface. Some surface representations have natural parameterizations (e.g., NURBS), while others, such as polygonal meshes, require non-trivial methods to obtain such parameterizations. In the latter group, parameterizations are represented in the same way as vertices are: as piecewise-linear approximations to continuous functions. Naturally, dense discretizations of these functions result in higher-quality approximations.

Figure 1:
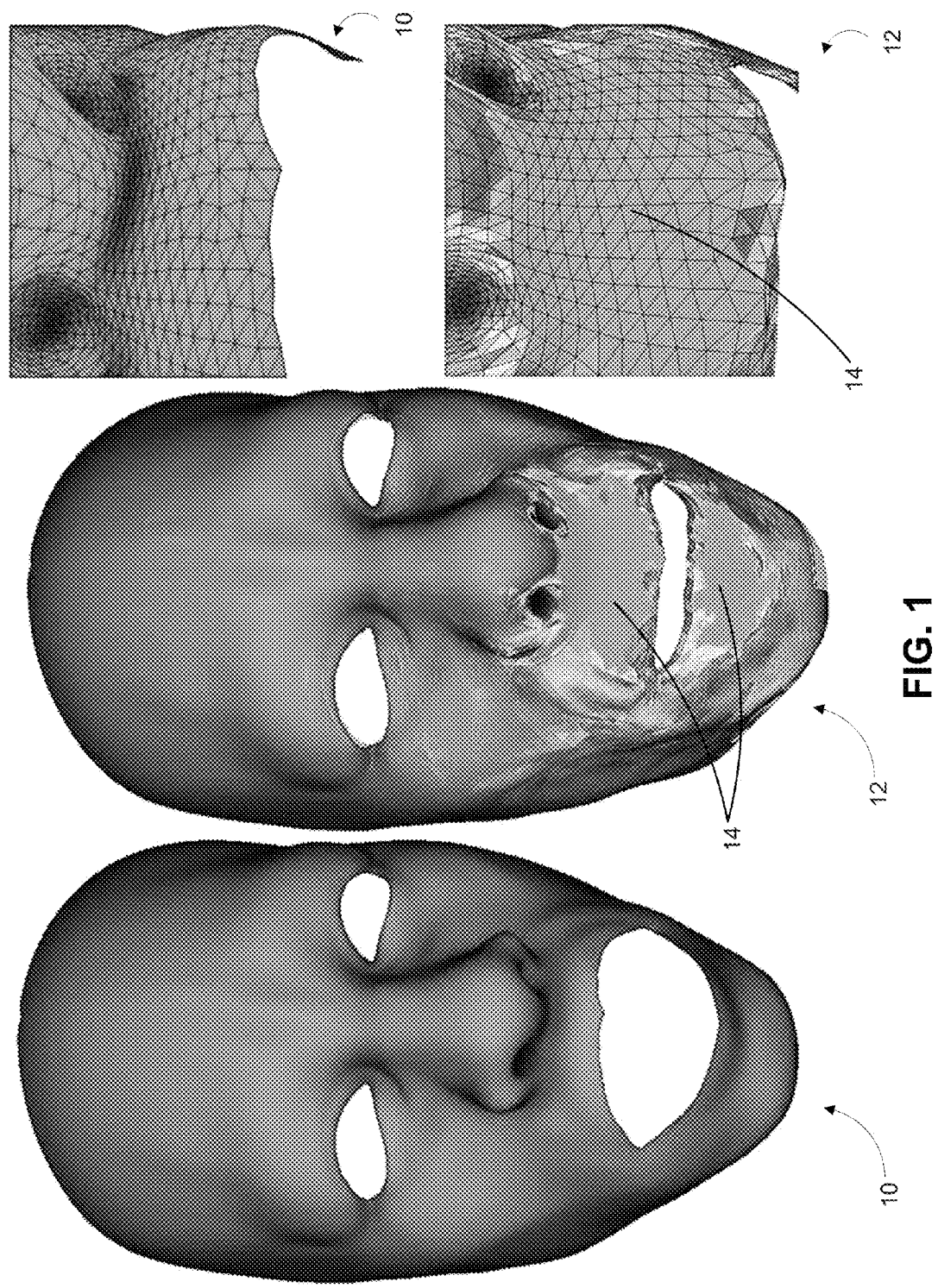
FIG. 1 is a sample animation frame of a face in a rest pose and a deformed pose.

A metric for the quality of a parameterization is the distortion introduced by the mapping. Another source of distortion is the error introduced by the piecewise-linear approximation, mentioned above. Both of these sources of distortion depend on the parameterization algorithm used, as well as the 3D surface discretization. Distortion can also be caused by a non-Euclidean transformation of an already parameterized surface: an optimal parameterization of the original surface can frequently be suboptimal for the deformed surface. An example is shown in FIG. 1, in which the left animation frame has been chosen as a rest pose 10. A deformed pose 12 is shown in the center, where deformation 14 of texture space relative to the chosen rest pose is shown around the mouth. A dose-up of the area under the nose is provided to further demonstrate the rest pose 10, the deformed pose 12, and the texture space deformation 14. When dealing with these types of distortions, reparameterizing the surface can be inefficient and impractical, as detail maps, such as bump maps, correspond to a single parameterization.

In production, in order to reduce texture space distortions in sensitive regions of an animated mesh, artists can introduce additional vertices, tightly bounding the rigid area and making sure that it does not distort under deformation. For rigged models, the regions around joints are the most prone to distortions, so additional vertices must be placed there. When the deformation is known, additional vertices can be placed appropriately so that deformation is spread to areas that don't contain any salient rigid features. The problem remains when the deformation is unknown or varying so much that adding vertices becomes impractical. A more difficult problem case is when the detail is dynamic, and salient features move during a deformation as the rigid areas that distort can change from frame to frame.

This disclosure introduces a method to reduce distortions introduced by deformation of a surface with an existing parameterization. In one embodiment, the distortions are reduced over a user-specified convex quadrilateral in texture space ensuring optimization is locally contained in areas of interest. The distortion minimization algorithm is guided by a user-supplied rigidity map of the specified quadrilateral. Non-linear optimization is used to calculate the axis-aligned deformation of a non-uniform grid specified over the quadrilateral's parameter space, so that when the space is remapped from the original to the deformed grid, the distortion of the rigid features are minimized. As the grids require minimal storage, and the remapping from a grid to another has minimal cost, grids for animation sequences can be precalculated and used for real-time texture space remapping that minimizes distortions on specified rigid features.

This application is relevant to at least the following fields: mesh parameterization, mesh deformation, and image retargeting.

Mesh parameterization techniques focus on computing bijective mappings from a 3D surface to a parameter domain. Currently available techniques eliminate the need for explicit parameterization by using the natural parameterization of subdivision surface quad faces and providing anisotropic filtering between faces. While this eliminates many of the explicit parameterization issues, such as distortions and seams, animated meshes still pose a problem, as the individual quads deform, and distortions are re-introduced. Other methods simulate skin sliding by remeshing the surface based on resampling of its parameter space. These techniques might use the Force Density Method (FDM) to construct embeddings of original and deformed patches into their parameter domains. However, as the technique deforms the actual geometry and force densities are specified on edges, the deformed patch needs to be highly tessellated and the result is dependent on the triangulation, which reduces the flexibility and applicability of the method.

Mesh deformation techniques focus on editing complex meshes in a physically plausible and aesthetically pleasing way, while preserving geometric details. Barycentric coordinates are also used for mesh deformation, by deforming complex meshes using simple control cages. Certain techniques approach content-aware deformation by introducing local bending and shearing stiffness as factors in how a mesh deforms. Given such material information, and transformations for a number of anchor triangles, they calculate the deformation of the mesh as a weighted sum or blend of the anchor transformations. The material information is user- or data-driven, providing additional control on how parts of the mesh deform when editing it. However, since the technique is targeted for mesh editing, it does not scale with the number of anchors. Other techniques focus on protecting vulnerable parts of a complex model under global non-uniform scaling. They define a vulnerability map on a volumetric grid that encloses the object, and transform the grid while respecting this map. While they estimate vulnerability based on slippage and normal curvature, the map can be user-driven. The technique focuses only on a very special deformation case (non-uniform scaling transform), so it is not applicable to more complex deformations.

Image retargetting techniques focus on content-aware resizing of images. This is a very specialized case of our goal, as the surface and parameterization of the image plane are trivial, and the deformation is a simple non-uniform scaling transform. Currently available techniques deform a uniform grid, overlayed on an image that undergoes non-uniform scaling, in order to minimize the As-Rigid-As-Possible (ARAP)/As-Similar-As-Possible (ASAP) energies of the underlying scaled image cells. The parameterization is 1D as the deformation is axis-aligned; each grid line moves along a single axis only. The technique is fast and produces smooth and robust retargetting results, but is restricted to non-uniform scaling of the image plane. One embodiment of the disclosed method develops this technique in the domain of surface deformation.

This disclosure proposes a reparameterization method, applicable to all parameterised, deformable surfaces, which takes into account salient, rigid features of a given static or animated detail map. The disclosed technique warps a parameter-space mesh. One embodiment of the reparameterization process, specific to axis-aligned deformation of a non-uniform grid, can be briefly described as a series of steps as follows:

1. A convex quad region is initially selected from the 2D parameterization domain; this is the region that the algorithm will process. This region is mapped to the unit square.
2. A non-uniform grid is partitioned to the unit square, clustering similar rigidity values to grid cells. Given the rigidity values of each grid cell, a single weight value is calculated on each.
3. The weight matrix along with the horizontal and vertical grid line coordinates are used as an input to the optimizer, which minimizes texture-space deformation energy by adjusting the line coordinates, keeping the domain boundary constant.
4. Finally, the process is completed by remapping the s and t coordinates of the unit square from their location in the original grid to the deformed grid.

The model region is expressed in 3D Euclidean space as O(s,t) (rest pose) and D(s,t) (deformed pose), where (s,t) are parametric coordinates on the unit square. The corresponding region in the 2D parameterization is expressed as T(s,t). The rigidity map is expressed as R(s,t), containing values on the unit square, 0 being non-rigid and 1 being rigid. The dimensions of the rigidity map are W×H and the dimensions of the non-uniform grid are N×M. Unless noted otherwise explicitly, zero-based indexing will be used. The 2D unit domain axes are specified as $\hat{s}$ (horizontal) and $\hat{t}$ (vertical). The solution vectors for each axis are represented as $\vec{s}$ and $\vec{t}$, and have lengths of (M+1) and (N+1) respectively. The undeformed grid lines are represented as $\vec{s}_{org}$ and $\vec{t}_{org}$. When the algorithm is discussed, as the calculations are performed once per axis, the axis that is not being optimized for will be referred to as the off-axis.

Non-Uniform Grid Generation

The selection of a convex region from the 2D parameterization domain guarantees the bijective property of the bilinear mapping to the unit square. The texture-space mesh that is overlayed on the convex region is chosen so that the resulting elements enclose as-similar-as-possible rigidity values and rigid areas are enclosed in such elements as tightly as possible. In one embodiment, grid lines are chosen so that the resulting non uniform grid cells enclose similar rigid values as tightly as possible.

Figure 2:
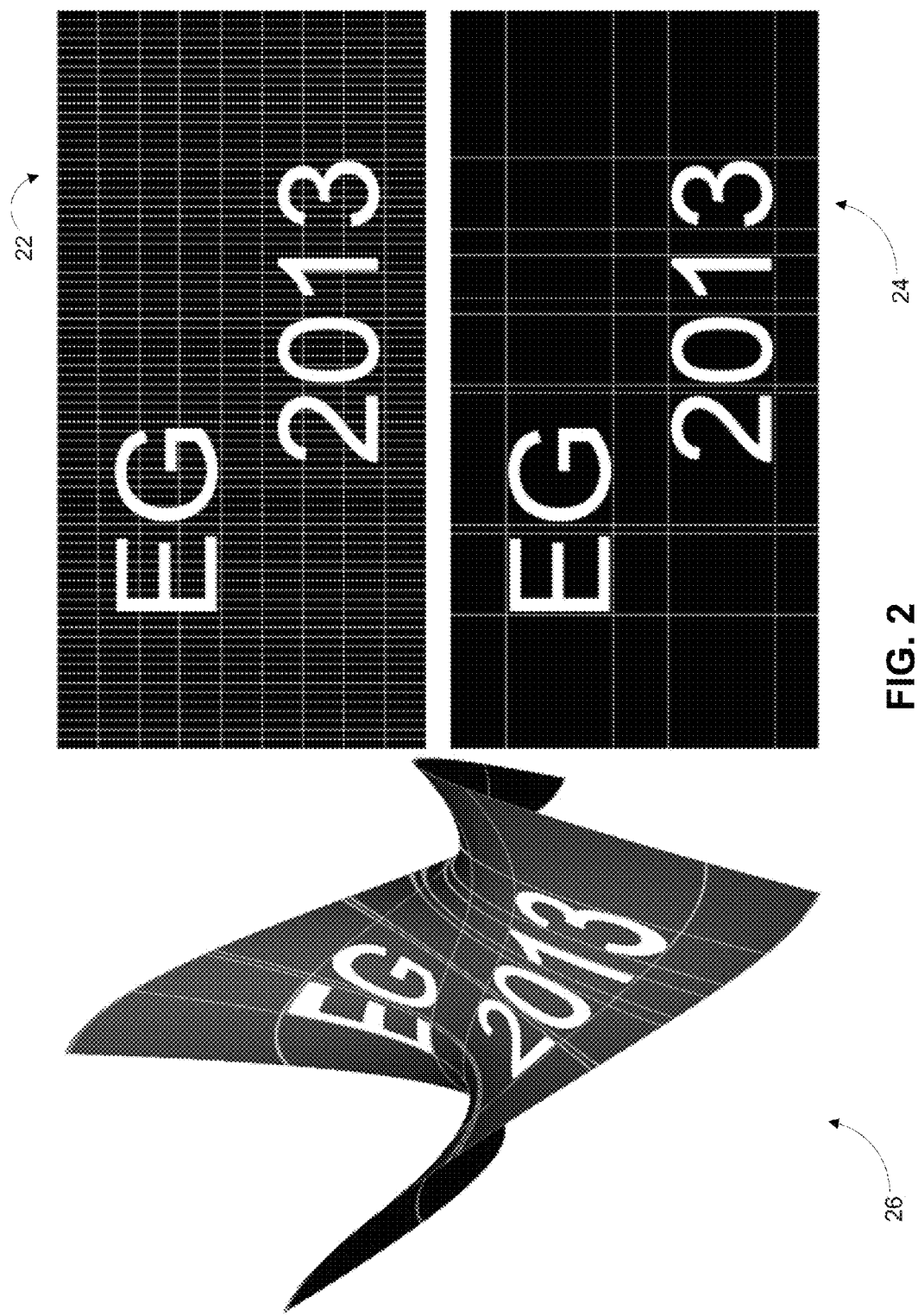
FIG. 2 is a comparison between uniform (top) and non-uniform (bottom) partitioning.

A comparison between uniform and non-uniform partitioning can be seen in FIG. 2, which contains a uniform grid 22 and a non-uniform grid 24 on a rigidity map. The uniform grid 22 is generated so that there are empty horizontal and vertical strips wherever possible, resulting in an 80×10 grid. The non-uniform grid 24 has partitioning that allows for fewer strips (11×5) and better grouping. The parameter space grid lines become curves in object space, as shown in the object space image 26 for the non-uniform grid 24.

Performance of the optimization process greatly depends on the density of the texture-space mesh. In one embodiment, if the rigidity map is binary, describing only if a point is rigid or not, the non-uniform grid can be automatically calculated with the following algorithm:

Data: R, W, H
Result: s,t

```
// Maximum per-row rigidity
for each row i = 0 → (H − 1) do
    r_i = max_{j∈[0,W−1]}R(i, j);
end
// Calculate r lines
t_0 ← 0;
idx ← 1;
for each row i = 0 → (H − 1) do
    if ||r_i − r_{i+1}|| > e then
        if r_i > r_{i+1} then
            r_idx ← i/(H − 1);
        else
            r_idx ← (i + 1)/(H − 1);
        end
        idx ← idx + 1;
    end
end
r_{idx−1} ← 1;
// ... Similarly for s lines
```

Alternatively, the non-uniform grid may be provided by a user.

After the texture-space mesh has been created, the weights associated with the mesh elements are calculated. In one embodiment, a N×M weight matrix is calculated after the calculation of the non-uniform grid lines. The entries of the weight matrix are the per-cell maximum rigidity values:

$$W_{ij} = \max_{x \in [s_j, s_{j+1}], y \in [t_i, t_{i+1}]} R((W-1)x, (H-1)y)$$

This can be calculated once as a preprocessing step, if the mapped detail (and thus the rigidity map) remains constant throughout deformation.

Grid Line Optimization

Given a starting texture-space mesh and associated weights, the deformed texture-space mesh is calculated that minimizes surface deformation energy per axis. In one embodiment, the per-cell energies of a non-uniform grid are the following:

$$E_s = \sum_{i=0}^{N-1} \sum_{j=0}^{M-1} W_{ij} E_{sij}$$

$$E_t = \sum_{i=0}^{N-1} \sum_{j=0}^{M-1} W_{ij} E_{tij}$$

These energies are the sum of weighted, per-cell energies. A line in unit parameter space corresponds to a curve in object space, as was shown in FIG. 2. Per cell, a line segment is selected that passes through the cell's midpoint and is parallel to the axis that is being optimized for. The per-cell deformation energy is calculated as the squared difference of the partial derivative lengths of the original and remapped curves that the line corresponds to.

So, for $\hat{s}$, the following equations may be used:

$$t_{i_m} = 0.5(t_i + t_{i+1})$$

$$E_{s_{ij}} = \int_{s_i}^{s_{j+1}} (\|D_s'(s, t_{i_m})\| - \|O_s'(s, t_{i_m})\|)^2 ds$$

The squared difference of the arc lengths of the original and remapped curves is insufficient as the remapping is piecewise-linear. So it is required that the curves maintain an identical speed so that, if the curves are subdivided into K segments, each sub-segment pair (original and deformed) has the same arc length.

Constraints

In order to better control the results, the following constraints are included in the solution space:

1. The boundary should remain fixed.
2. Fold-overs are not allowed.
3. There is a limit to how much an element can stretch or compress from its original state.
4. There is a limit to how much an element can change from its calculated deformed state in the last frame.
5. When an animation loop exists, the first and the last frames should have identical remapping.

All the above requirements can be satisfied with boundary constraints. In one embodiment, where the texture-space mesh is a non-uniform grid, the constraints are applied to the horizontal and vertical grid lines. The constraints will be described for the $\vec{s}$ solution only, as they are similar for $\vec{t}$. $\vec{s}_{prev}$ and $\vec{s}_{init}$ will be considered as the calculated solutions from the previous and the first frame respectively.

In order to fix the boundary, it is required that:

$$s_0 = 0$$

$$s_M = 1$$

For the rest of the constraints, we need to define three intervals (lower-upper boundaries) of varying priority: one for loop control (A), one for fold-over control (B) and one for maximum change per-frame control (C). The lowest priority interval controls the maximum change per-frame, m, as follows:

$$C_j = [s_{prevj} - m, s_{prevj} + m]$$

The middle priority interval controls fold-overs as follows:

$$B_j = \left[\frac{s_{prev_{j-1}} + s_{prev_j} + c_{min}}{2}, \frac{s_{prev_j} + s_{prev_{j+1}} - c_{min}}{2}\right]$$

where $c_{mins}$ the minimum allowed segment width. The highest priority interval ensures consistent remapping a looped animation consisting of K frames by adding the following constraint for the K-th frame:

$$d = \frac{K - |2k - K + 1| - 1}{2}$$

$$A_j = [s_{init_j} - dm_j, s_{init_j} + dm_j]$$

So for every d-th frame away from the closest of first and last frames, the solution distance is allowed to diverge by $m_j$ more. The calculation for the first (which is also last) frame should drop this constraint.

The boundary values for all s are calculated by combining the above intervals. We combine C with B, and then combine the result with A. We combine two intervals with different priorities, $I_{lo}$, $I_{hi}$, using set notation as follows:

$$I = I_{hi}, \text{ if } (I_{lo} \cap I_{hi} = \emptyset) \text{ or } (I_{lo} \supseteq I_{hi})$$

$$I_{lo}, \text{ if } I_{lo} \subseteq I_{hi}$$

$$I_{hi} \setminus (I_{hi} \cap I_{lo}), \text{ otherwise}$$

Remapping and Rendering

When rendering, given the original and deformed texture-space mesh, two options exist for reducing the distortions: altering the geometry or altering the texture coordinates. In one embodiment, let s and t be the parameter values of the starting non-uniform grid, s' and t' the remapped parameter values, $F_{org}(x, y)$ a piecewise-linear function where $$F_{org}\left(\frac{j}{M}, \frac{i}{N}\right) = (s_j, t_i),$$

and $F_{def}(x,y)$ similarly a piecewise-linear function where $$F_{def}\left(\frac{j}{M}, \frac{i}{N}\right) = (s'_j, t'_i);$$

both functions are strictly monotonic, so they can be inverted ($F_{org}^{-1}$ and $F_{def}^{-1}$).

To alter the geometry, (s', t') can be calculated given the starting (s,t), then D(s', t') is used to calculate the vertex positions and T(s, t) for the texture coordinates. To calculate (s', t'), the undeformed space can be transformed to the deformed space:

$$(s',t') = F_{def}(F_{org}^{-1}(s,t))$$

A potential drawback of this method is that if this remapping is performed at vertex resolution, the result will vary depending on the mesh resolution, as the pixels will interpolate the vertex geometry. As such, in an alternative embodiment, the texture coordinates may be altered instead. The process here is the inverse: the geometry is treated as being "corrected", so that the (s',t') values are actually known. From these, the original (s, t) values can be calculated, so that they can be used to obtain the texture coordinates. This is achieved by solving for (s,t) in the previous function:

$$F_{def}(F_{org}^{-1}(s,t)) = (s',t') \Rightarrow$$

$$(s,t) = F_{org}(F_{def}^{-1}(s',t'))$$

If the remappings are precomputed for a number of animation frames and the base geometry changes smoothly, solutions may be interpolated.

Implementation Details

In the disclosed embodiment, the optimization process uses the Levenberg-Marquardt algorithm with bound constraints. The objective function returns the deformation energies given a solution vector. The initial solution is either the original grid lines, or the calculated solution from the closest frame if it exists.

Grid Lines and Filtering

To avoid filtering artifacts, when calculating the starting texture-space mesh, it should be ensured that when separating a low rigidity from a high-rigidity element, the separating edge should move a few pixels towards the low-rigidity one, or otherwise, texture filtering can cause stretching of rigid detail. An additional consequence is that using hardware tri-linear filtering can also cause artifacts, as sampling from low resolution mipmaps can result in rigid detail bleeding in a non-rigid (and potentially highly deforming) neighbouring area.

Evaluating the Objective Function

As the objective function calculations can be evaluated in parallel, in one embodiment, a hybrid CPU/GPU implementation may be used with C++/Direct3D, where the objective function is calculated on the GPU and transfers the results back to C++.

Results

Figure 3:
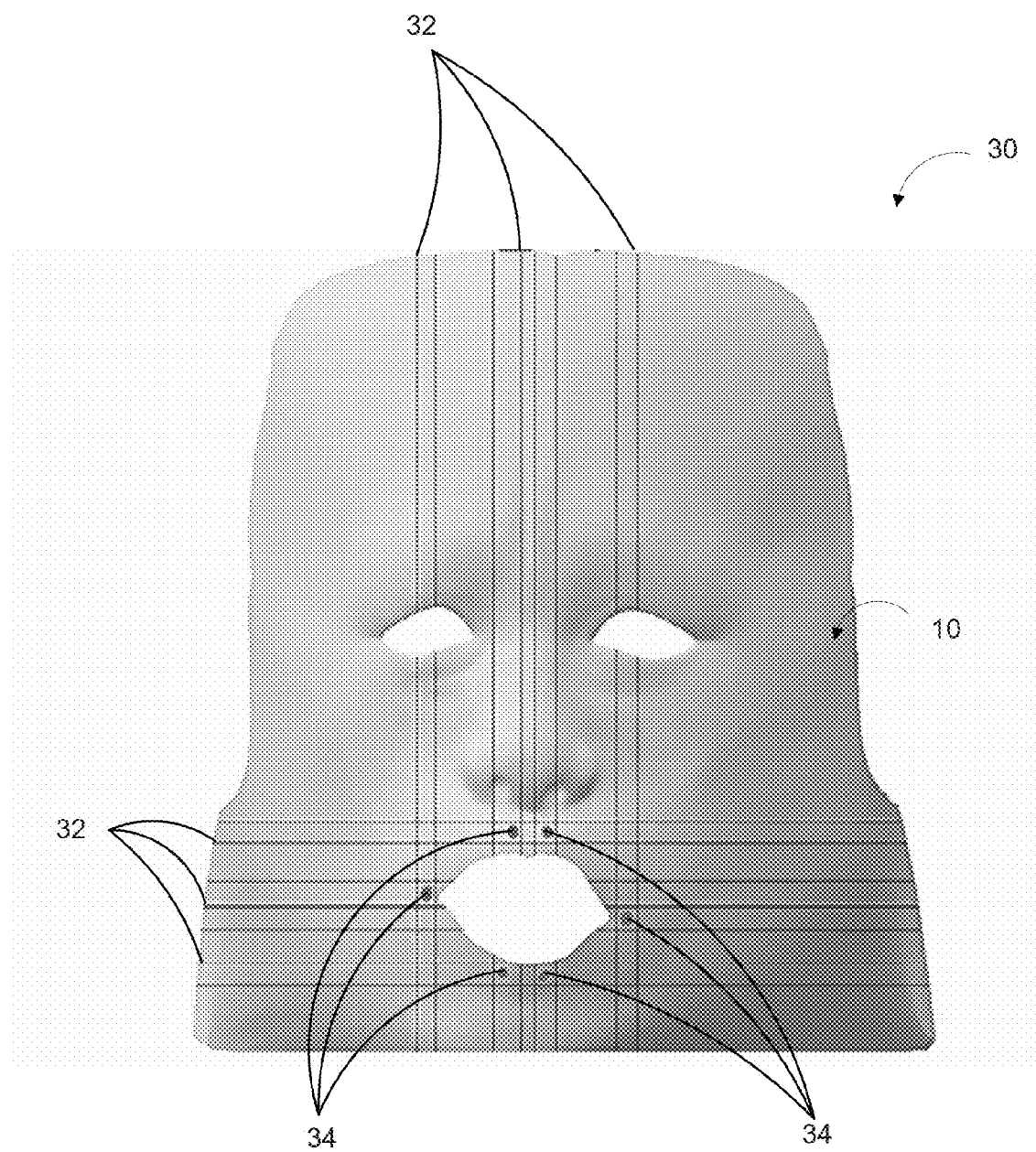
FIG. 3 is a UV-space view of the face of FIG. 1 in a rest pose with original non-uniform grid lines and marked rigid regions.
Figure 4:
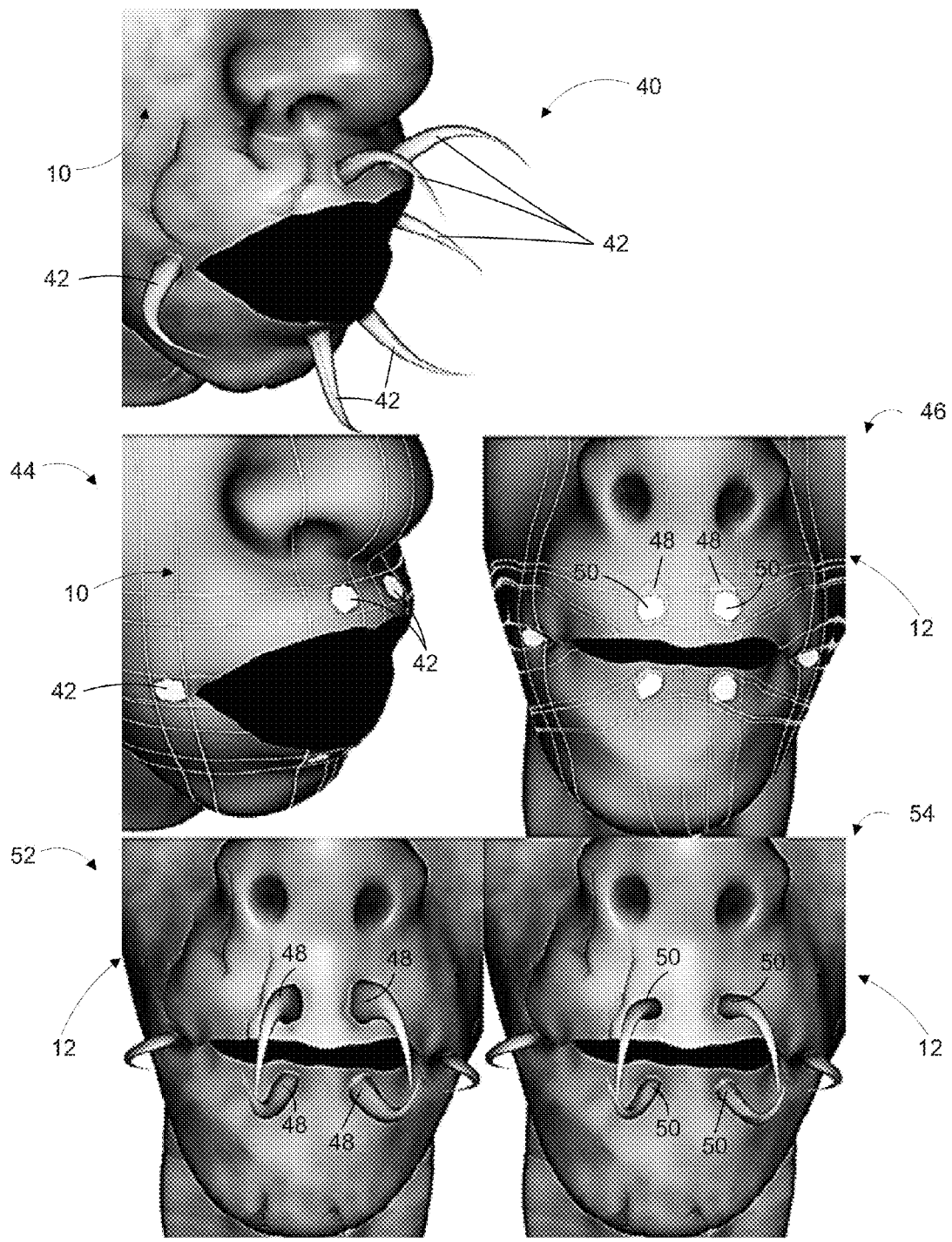
FIG. 4 is a set of fully rendered face animations in both rest and deformed poses (top row and bottom row). The face is also displayed in a grid view (middle row). The rendered face in a deformed pose is displayed without remapping (bottom left) and with remapping (bottom right).

The above-described algorithm was validated on a real dataset (face animation data from motion capture: 615 frames, 8,820 vertices and 17,216 triangles for data in FIGS. 1, 3 and 4) as well as procedurally defined geometry. Rigidity maps were authored for all cases. In the face animation data, the results are more subtle, as the captured data did not exhibit any extreme but localized deformation. FIG. 1, as discussed above, shows the face animation in a rest pose 10 and a deformed pose 12. FIG. 3 provides a UV-space view 30 of the face in the rest pose 10 with the original non-uniform grid lines 32. Six rigid areas 34 have been marked with dots. These six rigid areas 34 correspond to six facial spikes 42, which are shown in the fully rendered face in FIG. 4. First, FIG. 4 depicts a fully rendered face 40 in a rest pose 10. The fully rendered face 40 has six spikes 42, which should remain rigid even as the non-rigid features of the face 40 deform. As such, these regions have been marked as rigid in the rigidity map of FIG. 3. The middle row provides a grid view 44 of the face in the rest pose 10 and a grid view 46 of the face in the deformed pose 12. The spikes 42 are marked with lighter dots in the grid views. In the first grid view 44, the face is in the rest pose 10, and it can be seen that the spikes 42 are generally circular in shape. In the second grid view 46, the face is in a deformed pose 12. The second grid view 46 shows the deformed pose spikes with normal rendering (48) and with the disclosed, novel remapping (50). The normal rendering spikes 48 have become stretched vertically. The remapped spikes 50 maintain their generally circular shape. These differences are further shown in fully rendered views 52 and 54. In rendered view 52, remapping has not been performed, and it can be seem that the normal rendering spikes 48 are stretched vertically, compared to the rendered view 54, in which remapping has been performed so that deformations have been minimized in the remapped spikes 50.

As the optimization process is non-linear, the time required for the calculation of a solution for a given frame depends on the number of unknowns, the amount of deformation, as well as optimization parameters, and in the given implementation can range from milliseconds to seconds.

In some applications, the optimization algorithm may be too slow to be used in real-time. In these situations, the results may be precomputed for animation sequences. In one embodiment, the storage cost needed for a grid representing a single region is (M+N−2) floats, multiplied by the number of frames. So, 100 frames of animation for a moderately partitioned region (e.g. 10×10) would require about 7 KB, making the technique ideal for use in low GPU bandwidth devices.

Comparison to Increased Geometric Resolution

Figure 5:
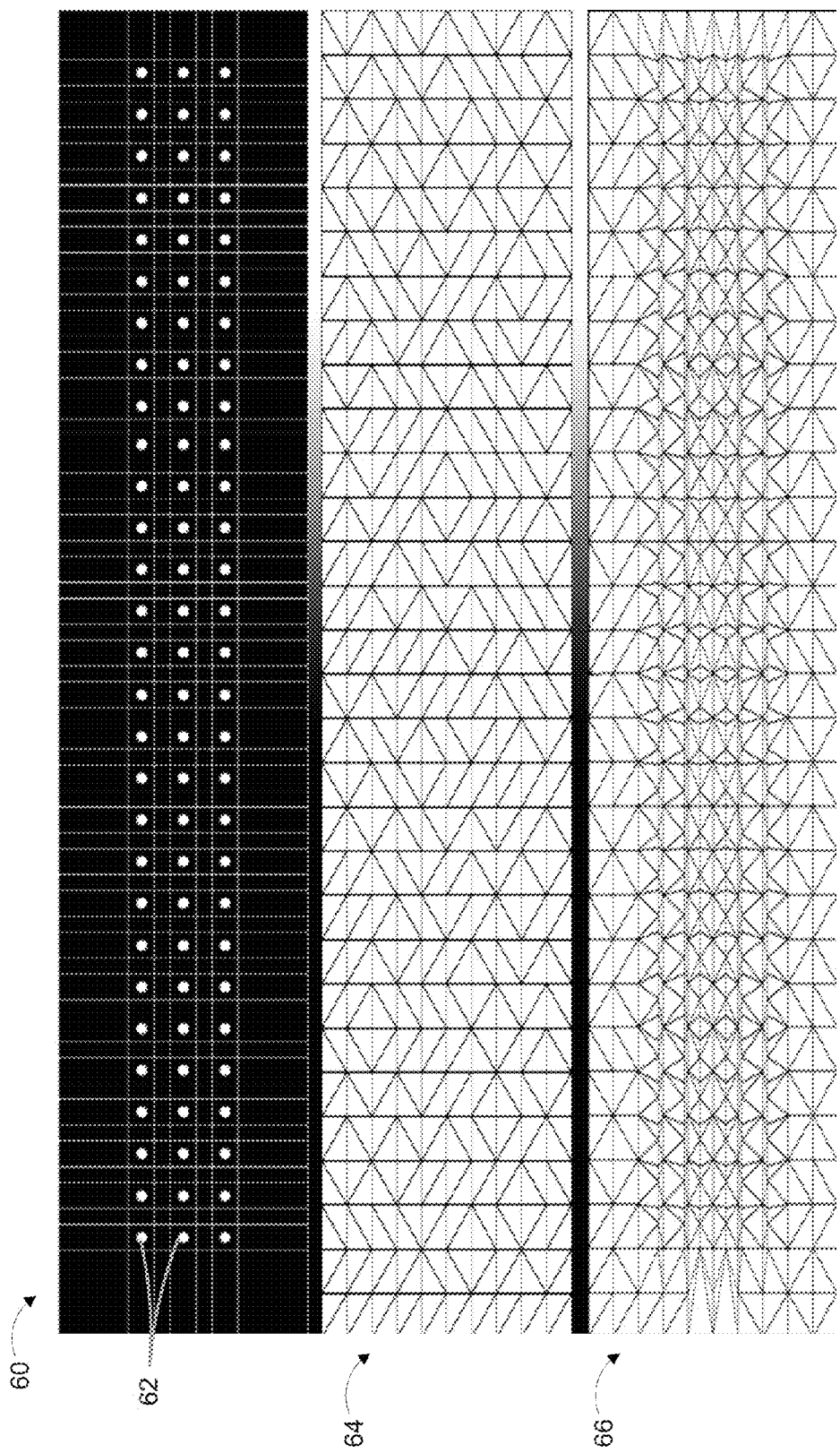
FIG. 5 is a rigidity map of a worm animation with non-uniform grid partitioning (top); a UV mesh of the worm (middle); and a revised UV mesh of the worm (bottom).

As mentioned previously, an alternative to the disclosed method for some cases is for artists to add more geometry around the rigid areas, so that the deformation in those areas is controllable. However, this alternative has significant drawbacks. An example is provided in FIG. 5 using a worm dataset. FIG. 5 provides a rigidity map and non-uniform grid partitioning in the top row 60. Rigid spikes 62 are marked with lighter circles. The middle row 64 is the original UV mesh. The mesh 64 can be constructed procedurally using a 2D mesh grid, and a moderate resolution for such a grid is 30×10. This results in 341 vertices and 600 faces. In order to control deformations of the rigid spikes 62, each spike 62 must be tightly bound by a quad. This new UV mesh 66 is provided in the bottom row of FIG. 5. In this new UV mesh 66, each rigid spike 62 is tightly bound by a quad. Adding all these extra vertices to the mesh and applying a Delaunay triangulation results in 689 vertices and 1296 faces, a 2× geometry cost. In addition to the geometry cost, there is also the cost of artist time spent on adding the vertices and tweaking the animation data. If the rigid areas in the texture change, all this extra work gets invalidated. Using the disclosed method, the original mesh 64 does not require any changes. The artist need not define the rigidity map 60 and the area of interest more than once. Assuming 16 keyframes for the animation sequence, the precalculated remappings require approximately 2.4 KB of memory space.

Figure 6:
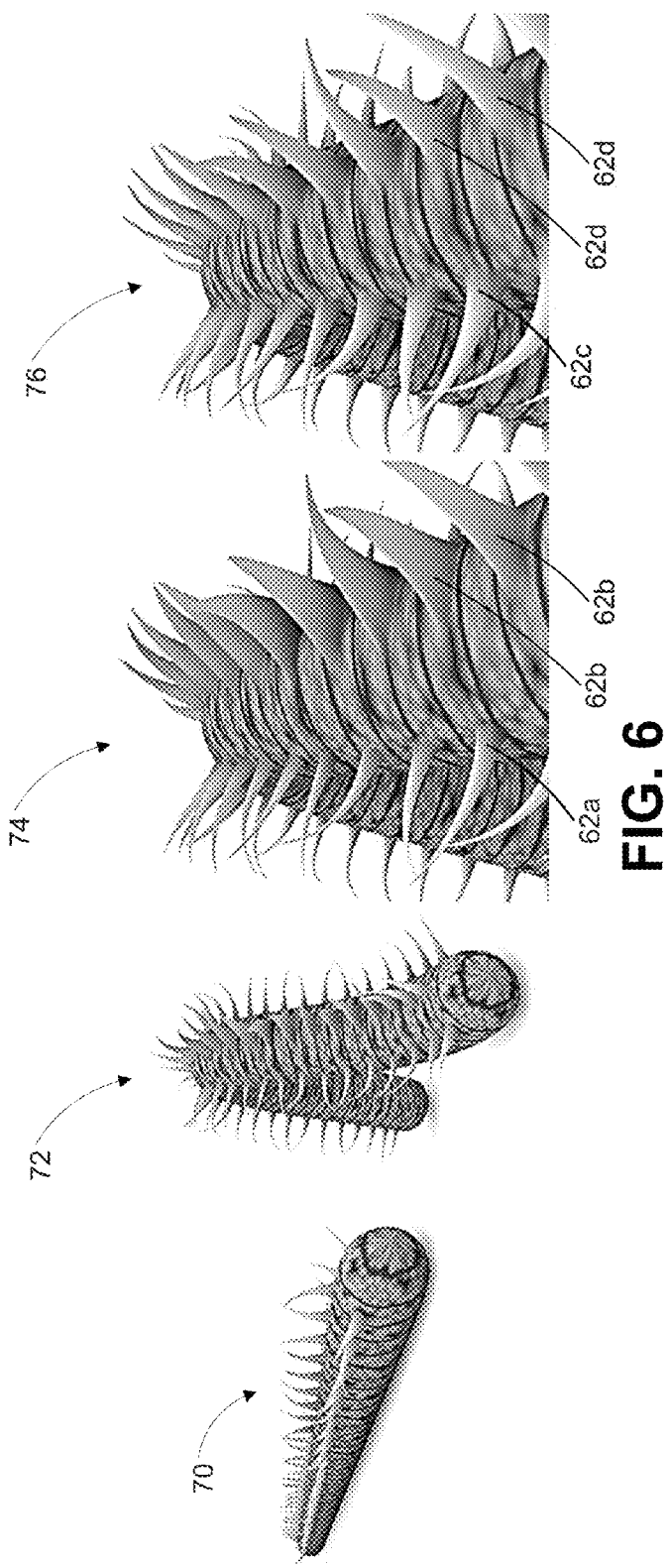
FIG. 6 is a fully rendered screenshot of the worm animation of FIG. 5, in both rest and deformed poses. There is provided a close-up view of the worm in a deformed pose, without remapping (middle right) and with remapping (extreme right).
Figure 7:
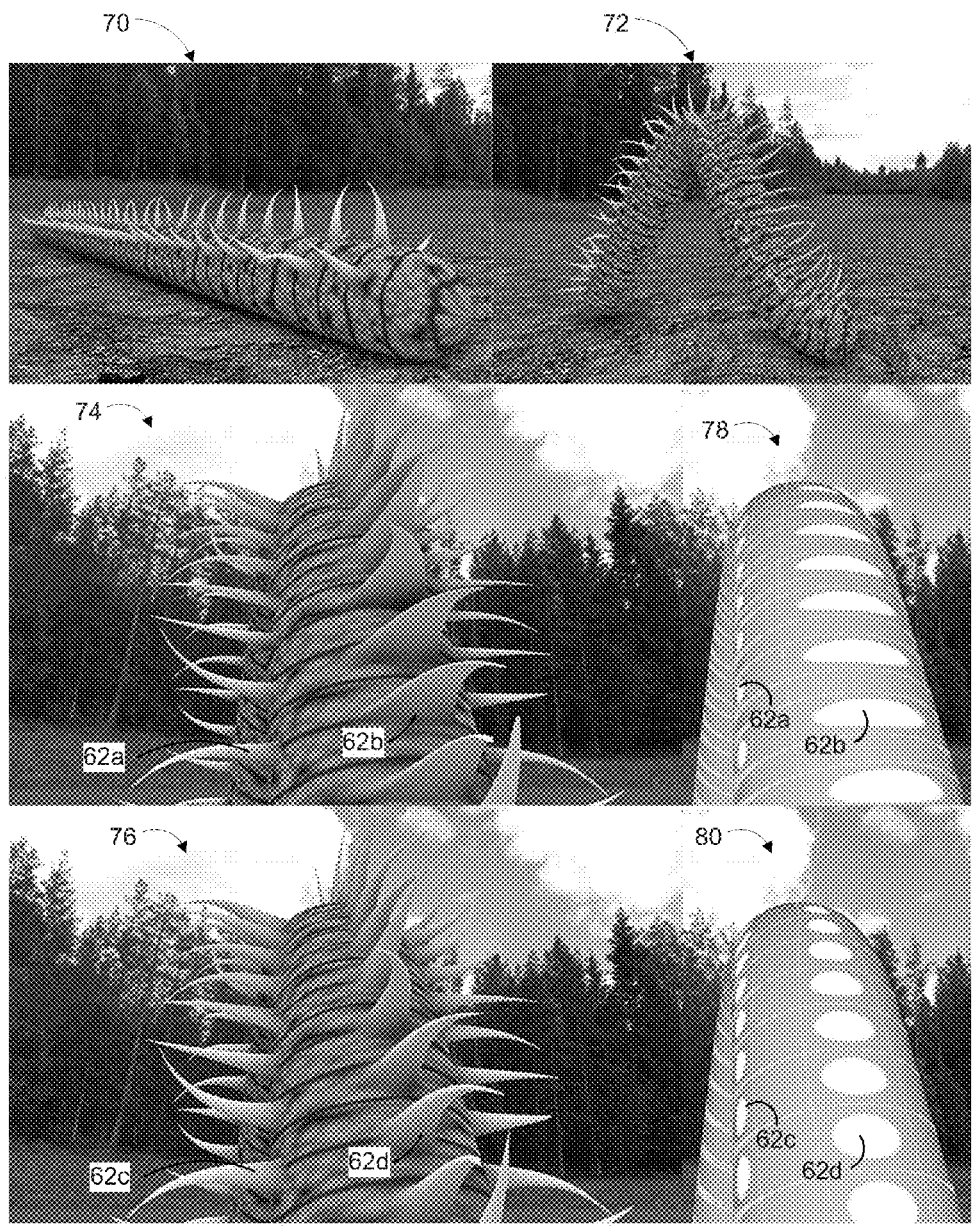
FIG. 7 is a set of fully rendered screenshots of the worm animation of FIG. 6 with corresponding grid views to more clearly demonstrate the distortions in the rigid areas.

FIG. 6 demonstrates the worm model using the disclosed vector displacement mapping. On the left, the worm model is shown in a rest pose 70 and a deformed pose 72. On the right, a close up of the worm in the deformed pose 72 is shown both without remapping (74) and with remapping (76). In the dose-up without remapping 74, deformations are clearly visible as the rigid spikes 62a have been shrunk and the rigid spikes 62b have been stretched with the mesh of the worm. In the remapped close-up 76, the rigid spikes 62c and 62d maintain their shape. FIG. 7 provides grid views 78 and 80 to more clearly demonstrate the deformations occurring in the rigid spikes 62. In the middle, non-remapped views 74 and 78, the deformed frame exhibits visible shrinking in the left row spikes 62a and stretching in the middle-row spikes 62b. After the remapping, in remapped views 76 and 80, the distortions are greatly diminished, with the spikes 62c and 62d maintaining their general shape.

CONCLUSION

This disclosure presents a technique to reparameterize regions in texture space, so that important rigid features on them remain undistorted under deformation of the surface they are mapped onto. The proposed algorithm achieves good results and has fast runtime evaluation and minimal storage requirements.

The technique can be used in a variety of scenarios, both offline and real-time. In modeling packages, artists can preview animations with mapped detail that scales in a content-aware manner, without altering the model geometry to achieve that. Animated, rigid detail on deformable objects also becomes a possibility, whereas previously it would require a significant amount of work from artists. In video games/real-time applications, precomputed remappings for canned animations can enhance the visual quality and suspension of disbelief by reducing the rigid detail distortion on deformable surfaces. In general, control cages/sparse meshes with static or dynamic detail are ideal candidates for use with this method, as the geometry remains unchanged and as a result it can be shared with more detail maps.

The optimization may require offline calculation to account for any deficits in speed.

In certain applications, the non-uniform grid generation may be problematic, due to the fact that, in order for the technique to work well, low-rigidity strips may be required to surround cells with rigid features. This problem can be solved by using splines instead of lines, still forming a warped grid. Using splines, the number of grid lines can be reduced and the grid generation can be more robust. Alternatively to the grid remapping, a continuous remapping function for a selected region could result in smoother warping of the parameter space, resulting in fewer visual artifacts.

The calculation of the initial non-uniform grid may also be automated based on performance preferences (e.g. by supplying number the M and N values). This would allow control over the quality of the final solutions while reducing the manual steps of the process to specifying a texture space region to optimize for and supplying the associated rigidity map.

Figure 8:
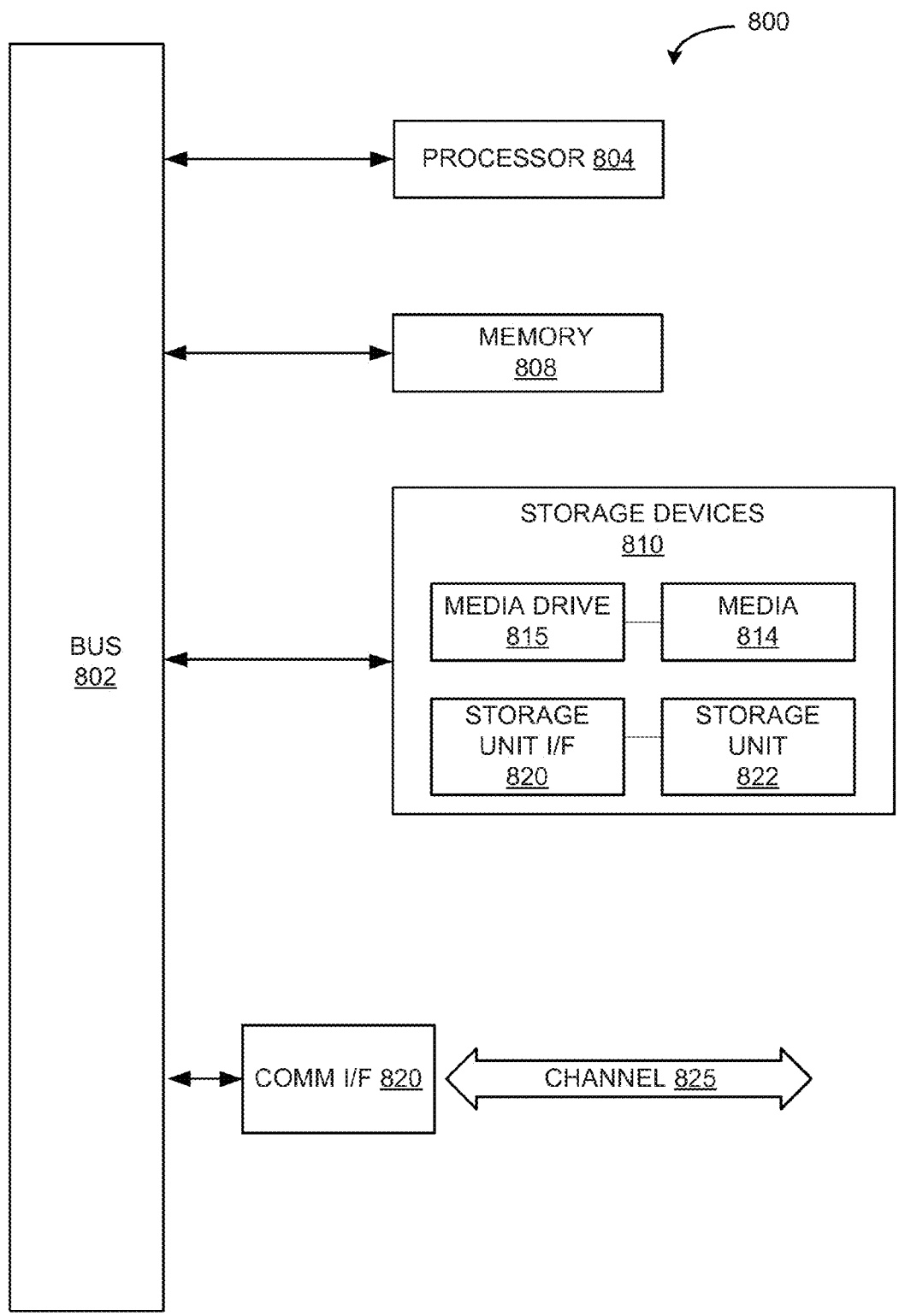
FIG. 8 illustrates an example computing module that may be used in implementing various features of embodiments of the methods described herein.

The disclosed methods and techniques may be implemented in whole or in part using software. In one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the disclosure using other computing modules or architectures.

Referring now to FIG. 8, computing module 800 may represent, for example, computing or processing capabilities found within desktop, laptop and notebook computers; handheld computing devices (PDA's, smart phones, tablets, cell phones, palmtops, etc.); mainframes, supercomputers, workstations or servers; or any other type of special-purpose or general-purpose computing devices as may be desirable or appropriate for a given application or environment. Computing module 800 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 800 might include, for example, one or more processors, controllers, control modules, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing module 400 or to communicate externally.

Computing module 800 might also include one or more memory modules, simply referred to herein as main memory 808. For example, random access memory (RAM) or other dynamic memory might be used for storing information and instructions to be executed by processor 804. Main memory 808 might also be used for storing temporary variables or other intermediate information during execution of instructions to be executed by processor 804. Computing module 800 might likewise include a read only memory ("ROM") or other static storage device coupled to bus 802 for storing static information and instructions for processor 804.

The computing module 800 might also include one or more various forms of information storage mechanism 810, which might include, for example, a media drive 412 and a storage unit interface 820. The media drive 812 might include a drive or other mechanism to support fixed or removable storage media 814. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer readable storage medium having stored therein computer software or data.

In alternative embodiments, information storage mechanism 810 might include other similar instrumentalities for allowing computer programs or other instructions or data to be loaded into computing module 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory module) and memory slot, a PCMCIA slot and card, and other fixed or removable storage units 822 and interfaces 820 that allow software and data to be transferred from the storage unit 822 to computing module 800.

Computing module 800 might also include a communications interface 824. Communications interface 824 might be used to allow software and data to be transferred between computing module 800 and external devices. Examples of communications interface 824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium" and "computer usable medium" are used to generally refer to media such as, for example, main memory 808, storage unit interface 820, storage media 814, and channel 828. These and other various forms of computer readable media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 800 to perform features or functions of the present disclosure as discussed herein.

While various embodiments of the application have been described above, it should be understood that they have been presented by way of example only, and not of limitation. Likewise, the various diagrams may depict an example architectural or other configuration for the application, which is done to aid in understanding the features and functionality that can be included in the application. The application is not restricted to the illustrated example architectures or configurations, but the desired features can be implemented using a variety of alternative architectures and configurations. Indeed, it will be apparent to one of skill in the art how alternative functional, logical or physical partitioning and configurations can be used to implement the desired features of the present application. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Although the disclosure has been presented with reference only to the presently preferred embodiments, those of ordinary skill in the art will appreciate that various modifications can be made without departing from this disclosure. Accordingly, this disclosure is defined only by the following claims.

The invention claimed is:

1. A computer-implemented method, comprising:
    receiving, with an optimizer computing device, a 2D parameterization domain of a computer animated surface having an existing parameterization, wherein the optimizer computing device comprises a non-transitory computer readable medium with an instruction set embedded thereon, the instruction set configured to cause the optimizer computing device to perform one or more steps of the computer-implemented method;
    selecting_a region from the 2D parameterization domain of the computer animated surface;
    receiving, from a storage, rigidity data on the selected region, the rigidity data comprising a rigidity value for each of a plurality of image cells;
    determining, with the optimizer computing device, one or more clusters of image cells with as-similar-as-possible rigidity values by comparing the rigidity value for each image cell with the rigidity value for one or more adjacent image cells;
    partitioning the selected region into a mesh comprising a plurality of elements, each element comprising a cluster of image cells with as-similar-as-possible rigidity values, thereby defining a resting state mesh;
    calculating, with the optimizer computing device, a weight value for each of the plurality of elements using the rigidity data, thereby defining a weight array; and
    determining a deformed state mesh by using data from the weight array to adjust the resting state mesh;
    wherein the resting state mesh and the deformed state mesh are overlaid on the surface having an existing parameterization to minimize distortion of the plurality of elements when the surface deforms.

2. The computer-implemented method of claim 1, wherein, the defined mesh is a non-uniform grid.

3. The computer-implemented method of claim 1, wherein, the selected region from the 2D parameterization domain is a convex quadrilateral region.

4. The computer-implemented method of claim 1, wherein, the selected region is partitioned such that similar rigidity values are clustered into a plurality of elements.

5. The computer-implemented method of claim 4, wherein,
    each of the plurality of elements are separated by boundary edges, and
    each boundary edge separating a lower rigidity element from a higher rigidity element is moved towards the lower rigidity element.

6. The computer-implemented method of claim 1, wherein,
    each of the plurality of elements yields a distortion energy value, and
    the deformed state mesh is determined by adjusting the resting state mesh such that a weighted sum of the distorted energy values for the selected area is minimized.

7. The computer-implemented method of claim 6, wherein, in determining the deformed state mesh, there is a limit to how much each of the plurality of elements may be deformed.

8. A non-transitory computer readable medium comprising an instruction set configured to cause a computing device to perform:
    selecting a region from a 2D parameterization domain of a computer animated surface having an existing parameterization;
    receiving rigidity data on the selected region, the rigidity data comprising a rigidity value for each of a plurality of image cells;
    determining one or more clusters of image cells with as-similar-as-possible rigidity values by comparing the rigidity value for each image cell with the rigidity value for one or more adjacent image cells;
    partitioning the selected region into a mesh comprising a plurality of elements, each element comprising a cluster of image cells with as-similar-as-possible rigidity values, thereby defining a resting state mesh;
    calculating a weight value for each of the plurality of elements using the rigidity data, thereby defining a weight array; and determining a deformed state mesh by using data from the weight array to adjust the resting state mesh;

wherein the resting state mesh and the deformed state mesh are overlaid on the surface having an existing parameterization to minimize distortion of the plurality of elements when the surface deforms.

9. The computer readable medium of claim 8, wherein the selected region from the 2D parameterization domain is a convex quadrilateral region.

10. The computer readable medium of claim 8, wherein, the selected region is partitioned such that similar rigidity values are clustered into a plurality of elements.

11. The computer readable medium of claim 8, wherein,
each of the plurality of elements are separated by boundary edges, and
each boundary edge separating a lower rigidity element from a higher rigidity element is moved towards the lower rigidity element.

12. The computer readable medium of claim 11, wherein,
each of the plurality of elements yields a distortion energy value, and
the deformed state mesh is determined by adjusting the resting state mesh such that a weighted sum of the distortion energy values for the selected area is minimized.

13. The computer readable medium of claim 12, wherein, in determining the deformed state mesh, there is a predetermined limit to how much each of the plurality of elements may be deformed.

\* \* \* \* \*

UNITED STATES PATENT AND TRADEMARK OFFICE
CERTIFICATE OF CORRECTION

PATENT NO. : 9,317,952 B2  
APPLICATION NO. : 13/838840  
DATED : April 19, 2016  
INVENTOR(S) : Charalampos Koniaris et al.

Page 1 of 1

It is certified that error appears in the above-identified patent and that said Letters Patent is hereby corrected as shown below:

In the Specification

Column 3, line 37: "dose-up" should be -- close-up --.
Column 10, line 14: "dose-up" should be -- close-up --.

Signed and Sealed this
Second Day of August, 2016

Michelle K. Lee
*Director of the United States Patent and Trademark Office*